United States Patent Office 3,118,926
Patented Jan. 21, 1964

3,118,926
PREPARATION OF γ-CHLOROBUTYRONITRILE
Bruce W. Horrom, Waukegan, Ill., assignor to Abbott Laboratories, North Chicago, Ill., a corporation of Illinois
No Drawing. Filed Oct. 21, 1957, Ser. No. 691,177
1 Claim. (Cl. 260—465.2)

This invention relates to a novel chemical process for preparing γ-chlorobutyronitrile.

γ-Chlorobutyronitrile is an intermediate employed in the preparation of dicyclopropyl ketoxime, which oxime has been demonstrated to possess marked properties as a muscle relaxant as disclosed in my co-pending application, S.N. 630,085, filed December 24, 1956, now abandoned.

My co-pending application, filed on the same date of the instant application, discloses a novel compound, γ-hydroxybutyramide and its preparation. The γ-hydroxybutyramide disclosed therein is employed in the novel process of this invention as a starting material. The process substantially involves halogenation and dehydration of said γ-hydroxybutyramide with an inorganic acid halide such as thionyl chloride, for example, to produce the corresponding γ-chlorobutyronitrile.

In the practice of the process, I prefer to use a small amount of pyridine admixed with γ-hydroxybutyramide when chlorinating with thionyl chloride. The acid chloride attaches itself to the hydroxyl group of the amide compound, and the pyridine facilitates the subsequent separation thereof.

The nitrile compound produced by this novel process is used in preparation of dicyclopropyl ketoxime. It is cyclized and hydrolyzed to produce cyclopropanecarboxylic acid. The acid is converted to an acid chloride form and, thereafter, treated with sodium cyclopropanecarboxylate to yield the anhydride of cyclopropanecarboxylic acid. The anhydride form is then combined with boron trifluoride to obtain dicyclopropyl ketone. The ketone form is oximinated with hydroxylamine hydrochloride to obtain the desired dicyclopropyl ketoxime.

The following example is set forth to illustrate the process in operation but it should be understood that it is not intended that said example be restricted to the exact proportions and reagents recited therein.

EXAMPLE

γ-Chlorobutyronitrile

To 51.5 gms. (0.5 mole) of γ-hydroxybutyramide and 0.25 cc. of pyridine is added, in dropwise fashion, 238 gms. (2 moles) of thionyl chloride, said addition leading to liquefaction of the mixture. The reaction mixture is cooled during the addition and, after said addition is completed, the reaction mixture is refluxed overnight. The excess thionyl chloride is removed by distillation at atmospheric pressure to isolate the product, γ-chlorobutyronitrile in a yield of 40 gms. (77.5%). The product boils at 70° C. (9 mm.) $N_D^{25}$, 1.4441.

Anal.—Calcd. For $C_4H_6NCl$: C, 46.43%; H, 5.84%; N, 13.52%; Cl, 34.24%. Found: C, 46.26%; H, 5.85%; N, 13.72%; Cl, 34.64%.

In the disclosed process, inorganic acid chlorides other than thionyl chloride may be employed as, for example, phosphorus trichloride, phosphorous pentachloride, phosphorus oxychloride and the like.

Others may practice the invention in any of the numerous ways which will be suggested by this disclosure to one skilled in the art. All such practice of the invention is considered to be a part hereof provided it falls within the scope of the appended claim.

I claim:

The method for preparing γ-chlorobutyronitrile comprising the addition of about two moles of thionyl chloride to about 0.5 mole of γ-hydroxybutyramide in the presence of catalytic amounts of pyridine, continuing the reaction under reflux conditions for about 16 hours and separating the product, γ-chlorobutyronitrile.

References Cited in the file of this patent

UNITED STATES PATENTS

| | | |
|---|---|---|
| 2,297,811 | Stocker | Oct. 6, 1942 |
| 2,802,777 | Lohr | Aug. 13, 1957 |

FOREIGN PATENTS

| | | |
|---|---|---|
| 1,008,725 | Germany | May 23, 1957 |

OTHER REFERENCES

Spath et al: Ber. 69, page 2729, 1936.
Degering: "An Outline of Organic Nitrogen Compounds," 1945, pages 410, 424 and 495.
Brewster: "Organic Chemistry," 2nd Edition, 1953, page 94.
Wagner and Zook: "Synthetic Organic Chemistry" 1953, page 596.
Schlattner: J.A.C.S. 63, 1941, page 1734.